(12) United States Patent
Obrovac et al.

(10) Patent No.: US 6,680,145 B2
(45) Date of Patent: Jan. 20, 2004

(54) LITHIUM-ION BATTERIES

(75) Inventors: Mark N. Obrovac, Ithaca, NY (US); Jeffrey R. Dahn, Hubley (CA)

(73) Assignee: 3M Innovative Properties Company, St. Paul, MN (US)

( * ) Notice: Subject to any disclaimer, the term of this patent is extended or adjusted under 35 U.S.C. 154(b) by 245 days.

(21) Appl. No.: 09/923,855

(22) Filed: Aug. 7, 2001

(65) Prior Publication Data

US 2003/0031931 A1 Feb. 13, 2003

(51) Int. Cl.[7] .................................................. H01M 4/48
(52) U.S. Cl. .............................. 429/231.95; 429/231.1; 429/231.3; 429/232; 29/623.1
(58) Field of Search .......................... 429/231.1, 231.3, 429/231.95, 232; 29/623.1

(56) References Cited

U.S. PATENT DOCUMENTS

| | | |
|---|---|---|
| 3,947,291 A | 3/1976 | Yao et al. |
| 4,009,052 A | 2/1977 | Whittingham |
| 4,049,887 A | 9/1977 | Whittingham |
| 4,233,377 A | 11/1980 | Haering et al. |
| 4,301,221 A | 11/1981 | Basu et al. |
| 6,203,944 B1 | 3/2001 | Turner et al. |
| 6,268,085 B1 * | 7/2001 | Manthiram et al. ......... 429/224 |

FOREIGN PATENT DOCUMENTS

| | | |
|---|---|---|
| JP | 7-176330 | 7/1995 |
| JP | 7-176331 | 7/1995 |

OTHER PUBLICATIONS

Cairns and Shimotake, "High–Temperature Batteries," *Science*, 1969, 164(3886):1347–1355.

Poizot et al., "Nano–sized transition–metal oxides as negative–electrode materials for lithium–ion batteries," *Nature*, 2000, 407:496–499.

* cited by examiner

Primary Examiner—Laura Weiner
(74) Attorney, Agent, or Firm—Dorothy P. Whelan; Lucy C. Weiss (57) ABSTRACT

Improved lithium-ion batteries in which the cathode comprises particles that include (i) transition metal grains having a grain size no greater than about 50 nanometers; and (ii) lithium-containing grains selected from the group consisting of lithium oxides, lithium sulfides, lithium halides (e.g., chloride, bromides, iodides, or fluorides), and combinations thereof.

25 Claims, 7 Drawing Sheets

Fig. 1

FIG. 2a  + DATA  — FIT

- - - - HCP Co
— - — - CCP Co
............. $Co_xFe_{1-x}$
✛ DATA
——— FIT

FIG. 6a
+ DATA
— FIT
□ Li$_2$S
▽ Fe

LITHIUM-ION BATTERIES

TECHNICAL FIELD

This invention relates to lithium-ion batteries.

BACKGROUND

Lithium-ion batteries typically include an anode, an electrolyte, and a cathode that contains lithium atoms intercalated within a lithium transition metal oxide. Examples of transition metal oxides that have been used include lithium cobalt dioxide, lithium nickel dioxide, and lithium manganese dioxide. None of these materials, however, exhibits an optimal combination of high initial capacity, high thermal stability, and good capacity retention after repeated charge-discharge cycling.

SUMMARY

In a first aspect, the invention features a lithium-ion battery that includes a cathode, an anode other than a lithium metal anode, and an electrolyte. The cathode comprises particles that include (i) transition metal grains having a grain size no greater than about 50 nanometers; and (ii) lithium-containing grains selected from the group consisting of lithium oxides, lithium sulfides, lithium halides (e.g., chloride, bromides, iodides, or fluorides), and combinations thereof.

In a second aspect, the invention features a lithium-ion battery that includes a cathode, an anode, and an electrolyte in which the cathode comprises particles that include (i) transition metal grains having a grain size no greater than about 50 nanometers; and (ii) lithium-containing grains selected from the group consisting of lithium sulfides, lithium halides (e.g., chloride, bromides, iodides, or fluorides), and combinations thereof.

In preferred embodiments, the cathode particles have diameters ranging from about 0.01 microns to about 30 microns. The lithium-containing grains preferably have a grain size no greater than about 50 nanometers. The transition metal grains preferably have a grain size no greater than about 20 nanometers. Examples of useful transition metals include iron, cobalt, chromium, nickel, vanadium, manganese, copper, zinc, zirconium, molybdenum, niobium, and combinations thereof.

In one useful embodiment, the particles are used as an additive in a lithium-transition metal oxide-based cathode such as a lithium cobalt dioxide-based cathode. The particles can provide a high capacity lithium source in cells, such as cells having graphite anodes, which would otherwise suffer from high irreversible capacity losses.

The invention also features a process for preparing a lithium-ion battery that includes (a) preparing a cathode comprising particles that include (i) transition metal grains having a grain size no greater than about 50 nanometers, and (ii) lithium-containing grains selected from the group consisting of lithium oxides, lithium sulfides, lithium halides, and combinations thereof; and (b) combining the cathode with an electrolyte and an anode to form the battery. In one embodiment, the cathode is prepared by ball milling a mixture that includes a transition metal and a lithium-containing compound selected from the group consisting of lithium oxides, lithium sulfides, lithium halides, and combinations thereof.

The lithium-ion batteries exhibit high initial capacities and good capacity retention after repeated charge-discharge cycling. In addition, they are readily manufactured because all of the lithium atoms needed to support the cell reaction can be incorporated in the cathode, which, unlike most anodes, is relatively stable in air in its lithium-containing (i.e., discharged) state.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

The lithium-ion battery includes an anode, a cathode, and an electrolyte. As manufactured, it is in a discharged state in which essentially all of the lithium atoms needed to support the cell reaction are in the cathode. The cathode, in turn, includes particles preferably having diameters ranging from about 0.01 to about 30 microns in which transition metal grains are separated by grains of lithium oxides, sulfides, halides, or combination thereof. Both the transition metal grains and the lithium-containing grains preferably are no greater than about 50 nanometers, more preferably no greater than about 20 nanometers. The presence of these grains can be detected using techniques such as x-ray diffraction.

A variety of transition metals are suitable for the transition metal grains. Specific examples include iron, cobalt, chromium, nickel, vanadium, manganese, copper, zinc, zirconium, molybdenum, niobium, and combinations thereof. Iron and cobalt are particularly preferred.

As noted above, the battery, as manufactured, is in a discharged state. During charging, lithium atoms are removed from the cathode, resulting in the formation of nanometer-sized transition metal oxides, sulfides, or halides. Upon subsequent discharging, the lithium atoms return to the cathode, resulting in re-formation of the transition metal grains and lithium-containing oxides, sulfides, or halides.

The above-described particles may be used alone in the cathode or used as an additive in combination with cathode materials such as lithium transition metal oxides, sulfides, halides, and the like. For example, the particles may be combined with conventional cathode materials such as lithium cobalt dioxide. The amount of particles to be added is selected such that the number of moles of lithium available from the particles matches the number of moles of lithium irreversibly consumed by the anode. The number of moles of lithium irreversibly consumed, in turn, is a function of the properties of the individual anode. Thus, for example, where the anode is graphite, the amount of particles added to the lithium transition metal oxide cathode is about 10% based upon moles of lithium.

The cathode is preferably prepared by ball milling transition metal particles and the lithium oxide, sulfide, or halide under high shear and high impact for an appropriate amount of time (typically on the order of 12–20 hours). Alternatively, the cathode may be prepared using techniques such as sputter deposition or rapid solidification of a melt containing the transition metal particles and the lithium oxide, sulfide, or halide. In either case, preparation is preferably conducted in an inert atmosphere such as a helium or argon atmosphere.

The cathode is combined with an anode and an electrolyte to form the lithium-ion battery. Examples of suitable anodes include lithium metal, graphite, and lithium alloy compositions, e.g., of the type described in Turner, U.S. Pat. No. 6,203,944 entitled "Electrode for a Lithium Battery" and Turner, WO 00/03444 entitled "Electrode Material and Compositions." The electrolyte may be liquid or solid. Examples of solid electrolytes include polymeric electrolytes such as polyethylene oxide, polytetrafluoroethylene, fluorine-containing copolymers, and combinations thereof. Examples of liquid electrolytes include ethylene carbonate, diethyl carbonate, propylene carbonate, and combinations thereof. The electrolyte is provided with a lithium electrolyte salt. Examples of suitable salts include $LiPF_6$, $LiBF_4$, and $LiClO_4$.

The invention will now be described further by way of the following examples.

EXAMPLES

Ball Milling Procedure

Active cathode composites were prepared by ball milling using a SPEX 8000D mixer mill. Hardened steel milling vials with an interior volume of about 64 cm³ were used. Generally, two 0.5 inch diameter hardened steel balls were added to the milling vial along with the reactants.

Electrochemical Cell Preparation $Li_2S$-containing cathodes were prepared in a helium-filled glovebox as follows. 200 mg active cathode material (prepared as described below), 260 mg of a 10% solution of Kynar Flex 2801 (a vinylidene fluoride-hexafluoropropylene copolymer commercially available from Atochem) in N-methyl pyrrolidinone, 25 mg Super S carbon black (commercially available from MMM Carbon, Belgium), and an additional 600 mg of N-methyl pyrrolidinone were mixed together with a brass rod for 5 minutes in a small glass vial to form a slurry. The slurry was spread onto a glass plate with a doctor blade having a 0.43 mm gap and then placed in a partially evacuated antechamber (10 kPa of He) for 12 hours to eliminate the N-methyl pyrrolidinone. The resulting dried film was then scraped off the glass, ground, and pressed into a 1.3 cm diameter pellet at a pressure of 1.3 GPa to form the cathode. The cathode was then taken into an argon-filled glove box where the electrochemical cell was constructed.

$Li_2O$-containing cathodes were prepared following the same procedure except that a gel formed after the ingredients had been stirred with the brass rod. The gel was scooped onto a glass sheet and placed in a partially evacuated antechamber (10 kPa of He) for 12 hours to eliminate the N-methyl pyrrolidinone. The resulting material was then scraped off the glass, ground, and pressed into an electrode as described above in the case of the $Li_2S$-containing cathode.

Figure 1:
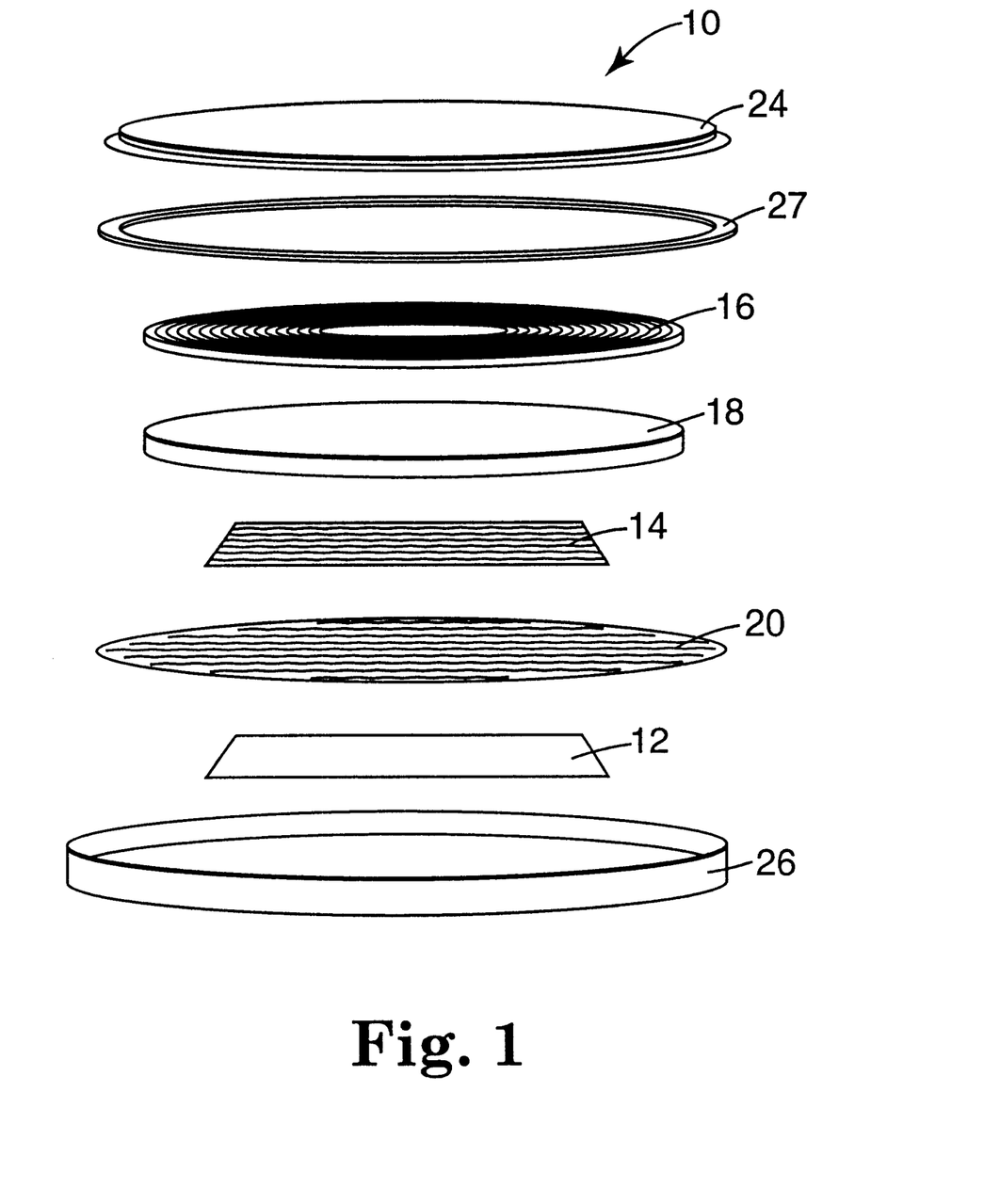
FIG. 1 is an exploded perspective view of an electrochemical cell used to test various cathode compositions.

An exploded perspective view of the electrochemical cell 10 used for both the $Li_2S$- and $Li_2O$-containing cathodes is shown in FIG. 1. A stainless steel cap 24 and special oxidation resistant case 26 contain the cell and serve as the negative and positive terminals respectively. The cathode 12 was the $Li_2S$- or $Li_2O$-containing cathode prepared as described above. The anode 14 was a lithium foil having a thickness of 125 micrometers; the anode also functioned as a reference electrode. The cell featured 2325 coin-cell hardware, equipped with a spacer plate 18 (304 stainless steel) and a disc spring 16 (mild steel). The disc spring was selected so that a pressure of about 15 bar would be applied to each of the cell electrodes when the cell was crimped closed. The separator 20 was a Celgard #2502 microporous polypropylene film (Hoechst-Celanese), which had been wetted with a 1M solution of $LiPF_6$ dissolved in a 30:70 volume mixture of ethylene carbonate and diethyl carbonate (Mitsubishi Chemical). A gasket 27 was used as a seal and to separate the two terminals.

Cells were cycled under thermostatic conditions at 30° C. and a C/60 rate using a constant current cycler with ±1% stability.

X-Ray Diffraction

A powder x-ray diffraction pattern for each sample was collected using a Siemens D5000 diffractometer equipped with a copper target X-ray tube and a diffracted beam monochromator. Grain sizes were estimated using the Scherrer equation and the widths of the measured diffraction lines. Samples were measured under helium in an air-tight sample holder. The data was analyzed using the Rietveld refinement program as described in R. J. Hill and C. J. Howard, Program for Rietveld Analysis of Fixed Wavelength X-ray and Neutron Powder Diffraction Patterns—Version LHPM 1, AAEC (Lucas Heights Research Laboratories, Australia); J. Appl. Cryst. 18, 173 (1985).

Example 1

A 64 ml hardened steel vial containing two 0.5 inch ball bearings was charged under a helium atmosphere with 3.3 g of a mixture of $Li_2O$ (97%, available from Aldrich Chemical) and Fe (99.98%, available from Aldrich Chemical). A 1:1 molar ratio of $Li_2O$ to Fe was used. The vial was sealed and then milled continuously for 16 hours to produce a $Li_2O$/Fe composite.

Figure 2A:
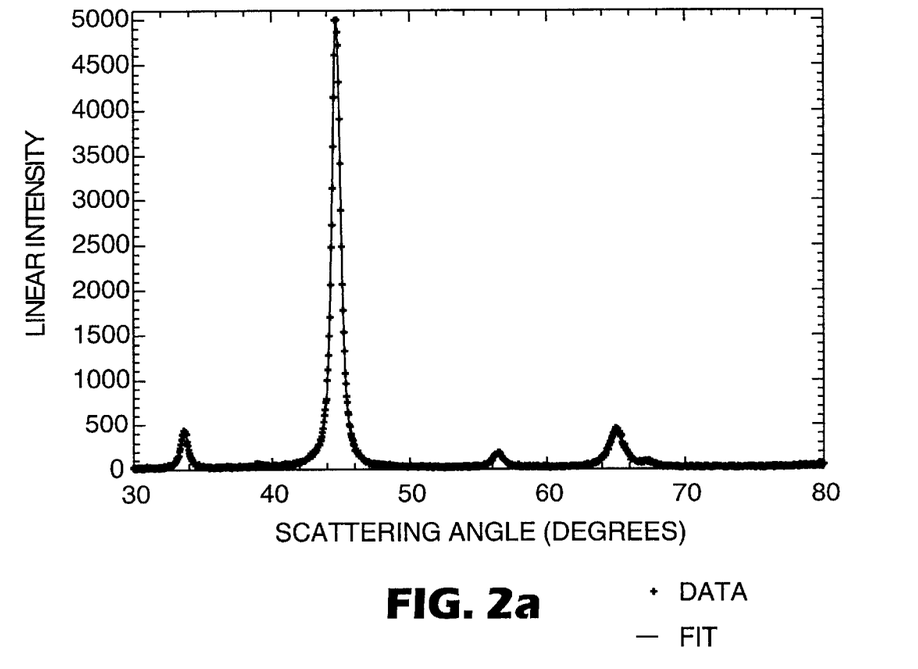
FIGS. 2(a) and 2(b) are x-ray diffraction patterns for the $Li_2O$/Fe composite described in Example 1 showing the Rietveld refinement.
Figure 2B:
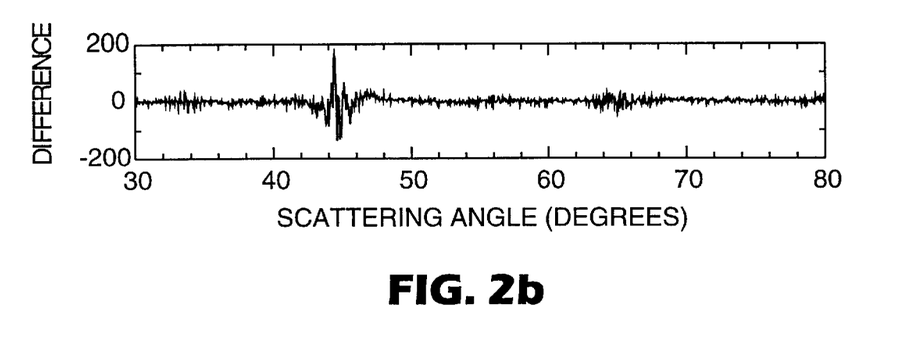

The Rietveld refinement to the x-ray diffraction pattern of the composite is shown in FIGS. 2(a) and 2(b). The pattern is in agreement with a refinement that assumed a mixture of $Li_2O$ and α-Fe. From the peak widths, the average grain size for the $Li_2O$ and α-Fe in the sample was estimated according to the Scherrer equation to be about 11 nm and 14.4 nm, respectively.

Figure 3:
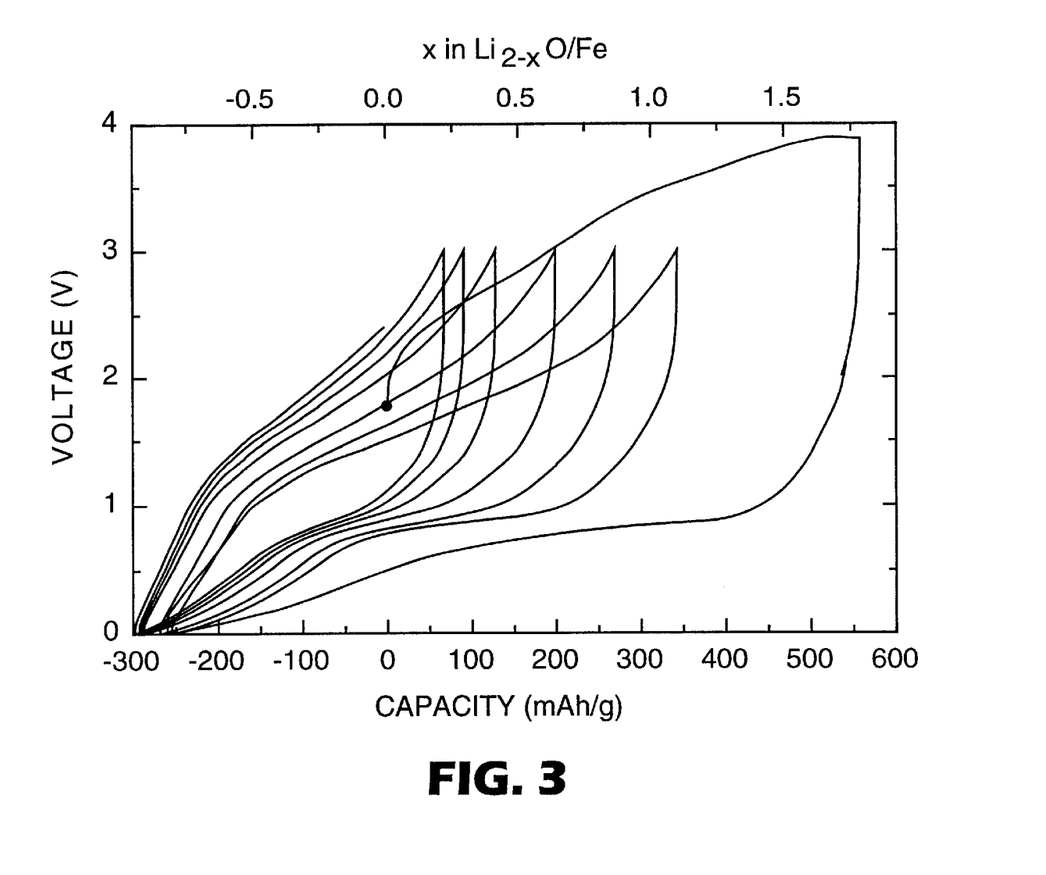
FIG. 3 is a voltage curve for an electrochemical cell incorporating the $Li_2O$/Fe composite described in Example 1.

The voltage curve for an electrochemical cell incorporating the composite is shown in FIG. 3. During the first charge, which started at 0 mAh/g, almost 600 mAh/g of capacity could be extracted. Good reversibility between 3.0V and 1.0V was also observed.

Example 2

A 64 ml hardened steel vial containing two 0.5 inch ball bearings was charged under a helium atmosphere with 3.3 g of a mixture of Li$_2$O (97%, available from Aldrich Chemical) and Co (−100 mesh, 99.9+%, available from Aldrich Chemical). A 1:1 molar ratio of Li$_2$O to Co was used. The vial was sealed and then milled continuously for 16 hours to produce a Li$_2$O/Co composite.

Figure 4A:
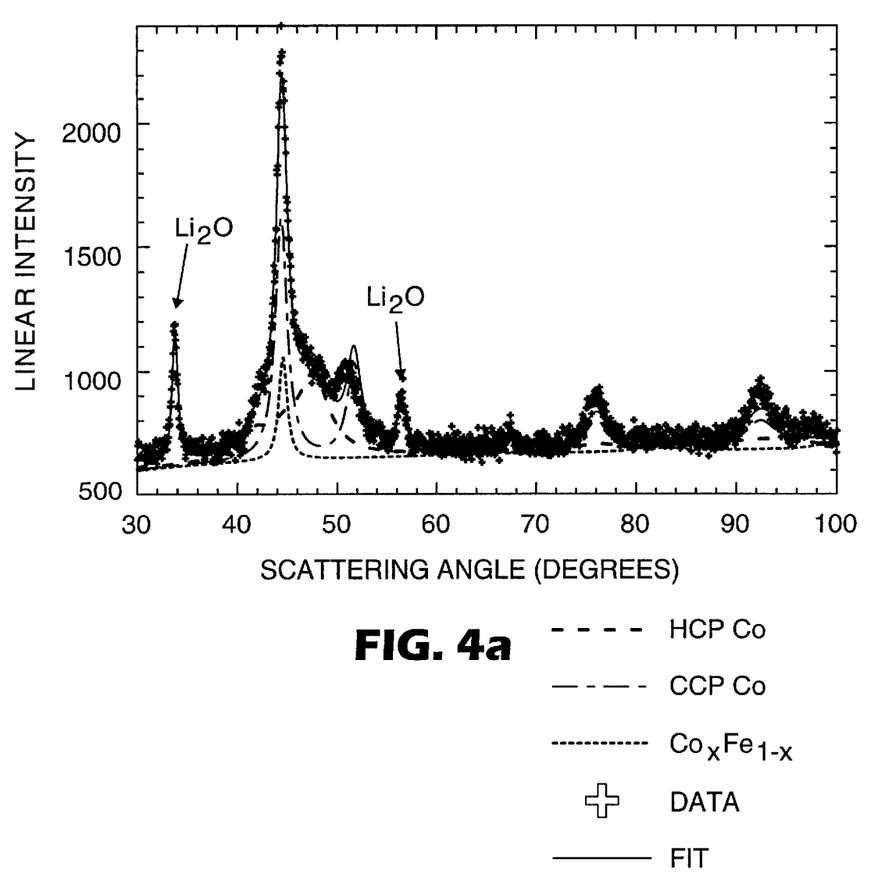
FIGS. 4(a) and 4(b) are x-ray diffraction patterns for the $Li_2O$/Co composite described in Example 2 showing the Rietveld refinement.
Figure 4B:
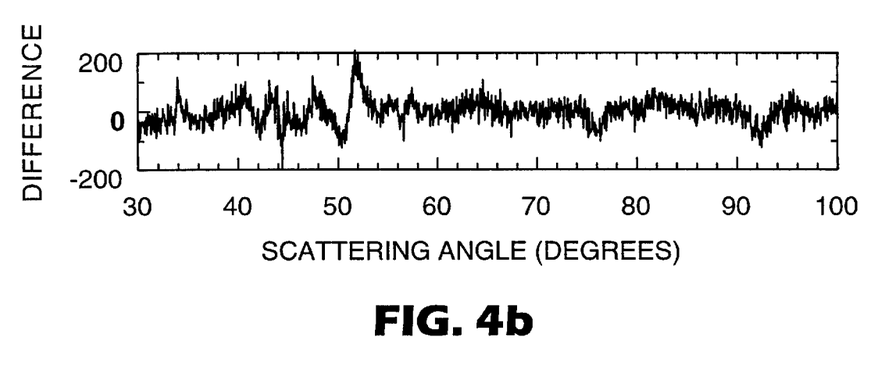

The Rietveld refinement to the x-ray diffraction pattern of the composite is shown in FIGS. 4(a) and 4(b). The pattern is in agreement with a refinement that assumed a mixture of Li$_2$O, CCP-Co, HCP-Co, and a Co$_x$Fe$_{1-x}$ impurity phase that likely arose from the milling media and α-Fe. From the peak widths, the average grain sizes were 13.1 nm for the Li$_2$O, 5.9 nm for the CCP-Co, 2.3 nm for the HCP-Co, and 10.3 nm for the Co$_x$Fe$_{1-x}$ impurity phase, estimated according to the Scherrer equation.

Figure 5A:
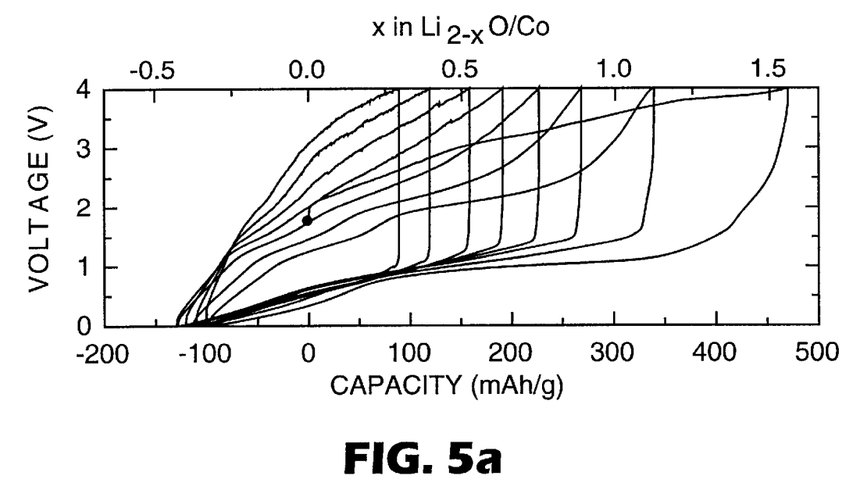
FIGS. 5(a) and 5(b) are voltage curves for an electrochemical cell incorporating the $Li_2O$/Co composite described in Example 2.
Figure 5B:
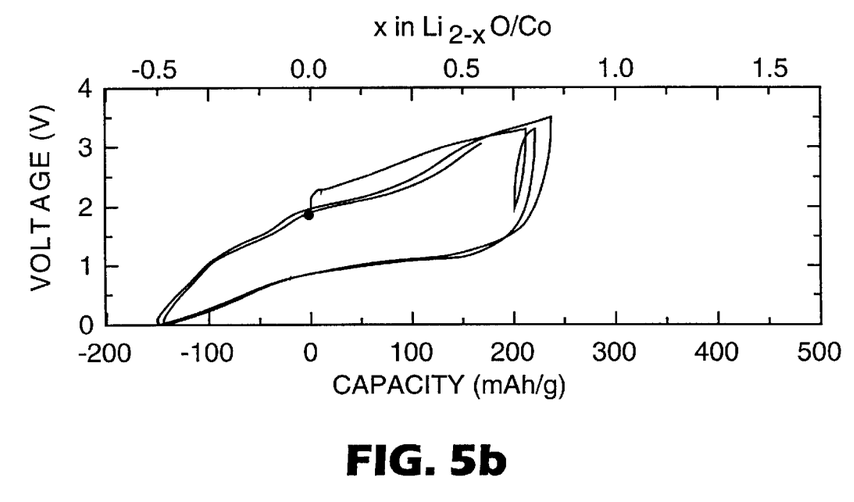

Voltage curves for an electrochemical cell incorporating the composite are shown in FIGS. 5(a) and 5(b). Cycling started at 0 mAh/g. In FIG. 5(a), the cell was cycled between 0V and 4V. This gave a first charge capacity of about 470 mAh/g, corresponding to about 1.5 formula units of lithium removed from the Li$_2$O/Co electrode. FIG. 5(b) shows the first three cycles of a Li$_2$O/Co cell where the upper voltage was limited to 3.5V. During the first charge, almost 250 mAh/g of capacity could be extracted. The cell also showed good reversibility between 3.3V and 0.0V.

Example 3

A 64 ml hardened steel vial containing two 0.5 inch ball bearings was charged under a helium atmosphere with 3.3 g of a mixture of Li$_2$S (98%, available from Aldrich Chemical) and Fe (99.98%, available from Aldrich Chemical). A 2:1 molar ratio of Li$_2$S to Fe was used. The vial was sealed and then milled continuously for 16 hours to produce a Li$_2$S/Fe composite.

Figure 6A:
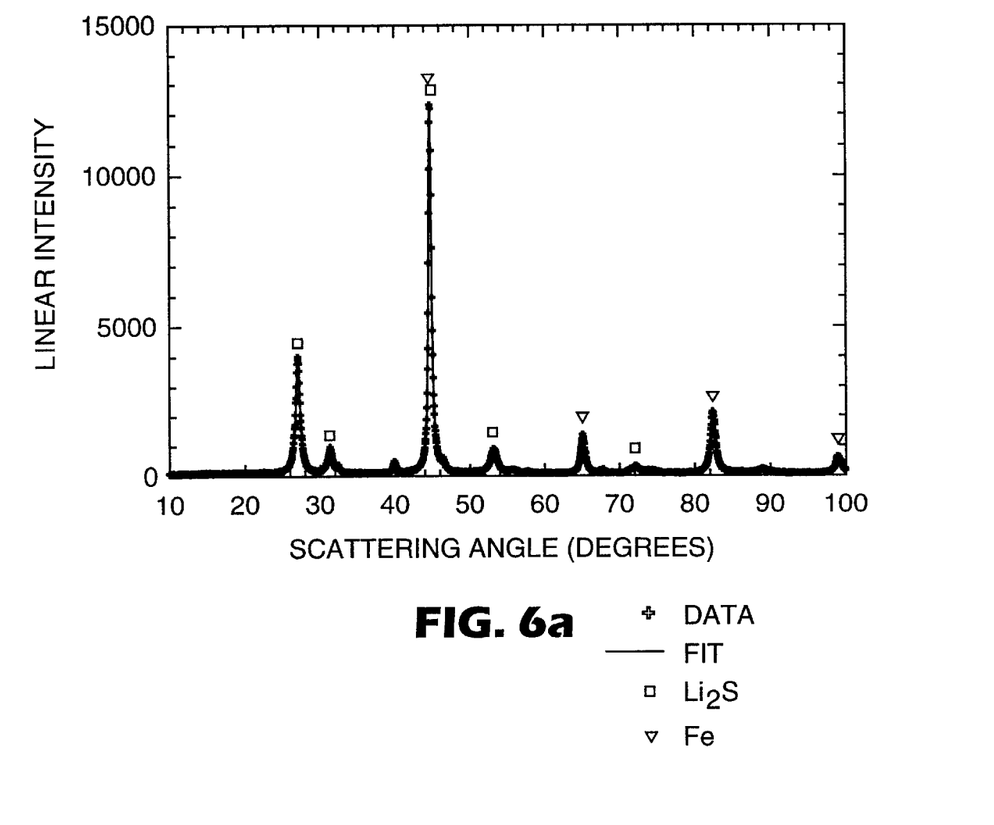
FIGS. 6(a) and 6(b) are x-ray diffraction patterns for the $Li_2S$/Fe composite described in Example 3 showing the Rietveld refinement.
Figure 6B:
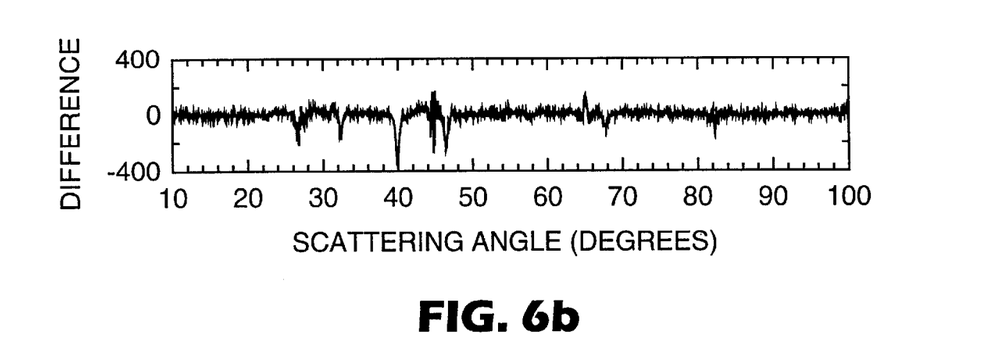

The Rietveld refinement to the x-ray diffraction pattern of the composite is shown in FIGS. 6(a) and 6(b). The pattern is in agreement with a refinement that assumed a mixture of Li$_2$S and α-Fe. From the peak widths, the average grain size for the Li$_2$S and α-Fe in the sample was estimated according to the Scherrer equation to be about 13 nm and 20 nm, respectively.

Figure 7A:
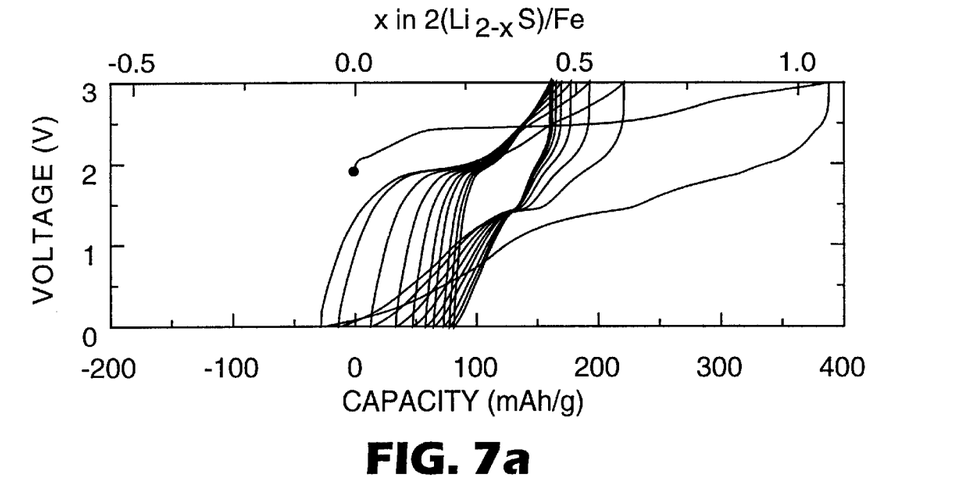
FIGS. 7(a) and 7(b) are voltage curves for an electrochemical cell incorporating the $Li_2S$/Fe composite described in Example 3.
Figure 7B:
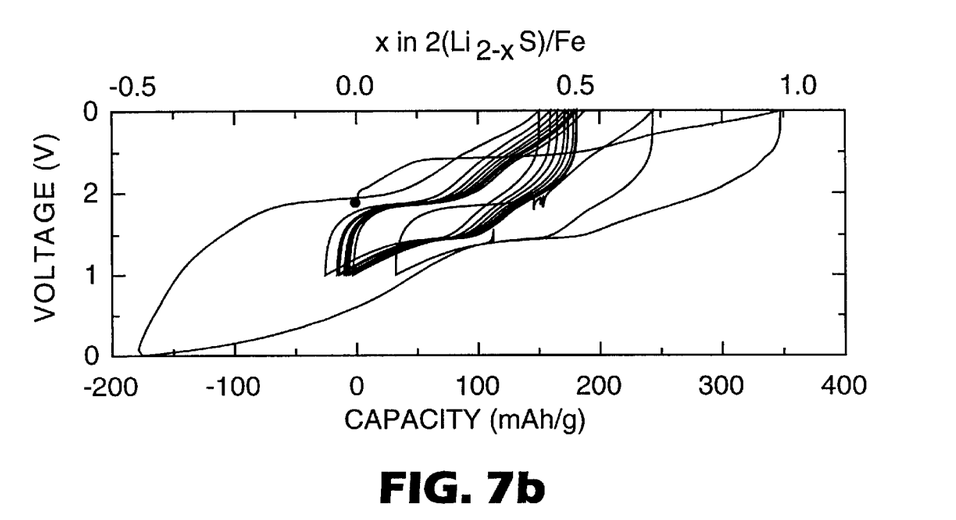

Voltage curves for an electrochemical cell incorporating the composite are shown in FIGS. 7(a) and 7(b). Cycling started at 0 mAh/g. In FIG. 7(a), the cell was cycled between 0V and 3V. One formula unit of lithium could be removed from Li$_2$S at this voltage. In FIG. 7(b), the cell was charged between 3V and 1V on its first cycle, between 3V and 0V on its second cycle, and between 3V and 1V for the remainder of the cycles. The first charge was similar to the cell shown in FIG. 7(a). After discharging to 1V, charging to 3V, and then discharging to 1V, the cell exhibited a large excess capacity. Subsequent cycles between 1V and 3V showed no capacity fading, little polarisation, and excellent reversibility.

A number of embodiments of the invention have been described. Nevertheless, it will be understood that various modifications may be made without departing from the spirit and scope of the invention. Accordingly, other embodiments are within the scope of the following claims.

What is claimed is:

1. A lithium-ion battery comprising:
    (a) a cathode comprising particles that include:
        (i) transition metal grains having a grain size no greater than about 50 nanometers; and
        (ii) lithium-containing grains selected from the group consisting of lithium oxides, lithium sulfides, lithium halides, and combinations thereof;
    (b) an anode other than lithium metal; and
    (c) an electrolyte.

2. A lithium-ion battery according to claim 1 wherein said lithium-containing grains have a grain size no greater than about 50 nanometers.

3. A lithium-ion battery according to claim 1 wherein said lithium-containing grains comprise lithium oxides.

4. A lithium-ion battery according to claim 1 wherein said lithium-containing grains comprise lithium sulfides.

5. A lithium-ion battery according to claim 1 wherein said lithium-containing grains comprise lithium halides.

6. A lithium-ion battery according to claim 1 wherein said transition metal grains have a grain size no greater than about 20 nanometers.

7. A lithium-ion battery according to claim 1 wherein said transition metal grains are selected from the group consisting of iron, cobalt, chromium, nickel, vanadium, manganese, copper, zinc, zirconium, molybdenum, niobium, and combinations thereof.

8. A lithium-ion battery according to claim 1 wherein said transition metal grains comprise iron grains.

9. A lithium-ion battery according to claim 1 wherein said transition metal grains comprise cobalt grains.

10. A lithium-ion battery according to claim 1 wherein said cathode further comprises a lithium transition metal oxide admixed with said particles.

11. A lithium-ion battery according to claim 10 wherein said lithium transition metal oxide comprises lithium cobalt dioxide.

12. A lithium-ion battery according to claim 1 wherein said particles have diameters ranging from about 0.01 microns to about 30 microns.

13. A lithium-ion battery comprising:
    (a) a cathode comprising particles that include:
        (i) transition metal grains having a grain size no greater than about 50 nanometers; and
        (ii) lithium-containing grains selected from the group consisting of lithium sulfides, lithium halides, and combinations thereof;
    (b) an anode; and
    (c) an electrolyte.

14. A lithium-ion battery according to claim 13 wherein said lithium-containing grains have a grain size no greater than about 50 nanometers.

15. A lithium-ion battery according to claim 13 wherein said lithium-containing grains comprise lithium sulfides.

16. A lithium-ion battery according to claim 13 wherein said lithium-containing grains comprise lithium halides.

17. A lithium-ion battery according to claim 13 wherein said transition metal grains have a grain size no greater than about 20 nanometers.

18. A lithium-ion battery according to claim 13 wherein said transition metal grains are selected from the group consisting of iron, cobalt, chromium, nickel, vanadium, manganese, copper, zinc, zirconium, molybdenum, niobium, and combinations thereof.

19. A lithium-ion battery according to claim 13 wherein said transition metal grains comprise iron grains.

20. A lithium-ion battery according to claim 13 wherein said transition metal grains comprise cobalt grains.

21. A lithium-ion battery according to claim 13 wherein said cathode further comprises a lithium transition metal oxide admixed with said particles.

22. A lithium-ion battery according to claim 21 wherein said lithium transition metal oxide comprises lithium cobalt dioxide.

23. A lithium-ion battery according to claim 13 wherein said particles have diameters ranging from about 0.01 microns to about 30 microns.

24. A process for preparing a lithium-ion battery comprising:
 (a) preparing a cathode comprising particles that include:
  (i) transition metal grains having a grain size no greater than about 50 nanometers; and
  (ii) lithium-containing grains selected from the group consisting of lithium oxides, lithium sulfides, lithium halides, and combinations thereof; and
 (b) combining said cathode with an electrolyte and an anode to form a lithium-ion battery.

25. A process according to claim 24 comprising preparing said cathode by ball milling a mixture that includes (a) a transition metal and (b) a lithium-containing compound selected from the group consisting of lithium oxides, lithium sulfides, lithium halides, and combinations thereof.

* * * * *